United States Patent
Keuning

(10) Patent No.: US 9,409,636 B2
(45) Date of Patent: Aug. 9, 2016

(54) VESSEL WITH IMPROVED MOTION CONTROL

(71) Applicant: Technische Universiteit Delft, Delft (NL)

(72) Inventor: Jan Alexander Keuning, Willemstad (NL)

(73) Assignee: Technische Universiteit Delft, Delft (NL)

( * ) Notice: Subject to any disclaimer, the term of this patent is extended or adjusted under 35 U.S.C. 154(b) by 0 days.

(21) Appl. No.: 14/413,311

(22) PCT Filed: Jul. 9, 2013

(86) PCT No.: PCT/EP2013/064490
§ 371 (c)(1),
(2) Date: Jan. 7, 2015

(87) PCT Pub. No.: WO2014/009372
PCT Pub. Date: Jan. 16, 2014

(65) Prior Publication Data
US 2015/0136010 A1 May 21, 2015

(30) Foreign Application Priority Data

Jul. 10, 2012 (EP) .................................... 12175711

(51) Int. Cl.
| | | |
|---|---|---|
| *B63B 1/22* | (2006.01) | |
| *B63B 39/06* | (2006.01) | |
| *B63B 1/10* | (2006.01) | |
| *B63B 1/18* | (2006.01) | |
| *B63B 1/32* | (2006.01) | |
| *B63B 1/20* | (2006.01) | |

(52) U.S. Cl.
CPC ............... *B63B 39/061* (2013.01); *B63B 1/10* (2013.01); *B63B 1/18* (2013.01); *B63B 1/322* (2013.01); *B63B 2001/204* (2013.01); *B63B 2001/325* (2013.01); *Y02T 70/12* (2013.01)

(58) Field of Classification Search
CPC ............ B63B 39/061; B63B 1/10; B63B 1/18
USPC ................................................. 114/284–286
See application file for complete search history.

(56) References Cited

U.S. PATENT DOCUMENTS

| | | | | |
|---|---|---|---|---|
| 3,601,078 | A * | 8/1971 | Bedford | B63B 39/061 114/271 |
| 6,571,724 | B1 | 6/2003 | Shen | |
| 7,143,711 | B1 * | 12/2006 | Wolske | B63B 39/061 114/285 |
| 7,434,531 | B1 | 10/2008 | Zsido et al. | |
| 2007/0101920 | A1 | 5/2007 | Loui et al. | |

OTHER PUBLICATIONS

International Search Report and Written Opinion from the European Patent Office mailed Aug. 20, 2013 for corresponding International Application No. PCT/EP2013/064490, filed Jul. 9, 2013.

* cited by examiner

*Primary Examiner* — Stephen Avila
(74) *Attorney, Agent, or Firm* — Westman, Champlin & Koehler; Steven Koehler

(57) ABSTRACT

The invention concerns a vessel having a planing surface and a transom at a stern of the vessel, mounted on the transom is an interceptor and an actuator to move the interceptor in vertical direction. In accordance with the invention the transom defines a sharp edge with the planing surface and the underside of the interceptor comprises a convex rounded edge extending upwards to the rear with a leading edge of the convex rounded edge having a tangent approximately parallel to the water flow along the planing surface near the transom, and/or the transom defines a convex rounded edge with the planing surface with a leading edge of the convex rounded edge being tangent to the planing surface and the interceptor defines at its lowest part a sharp edge that can move behind the convex rounded edge in vertical direction.

25 Claims, 4 Drawing Sheets

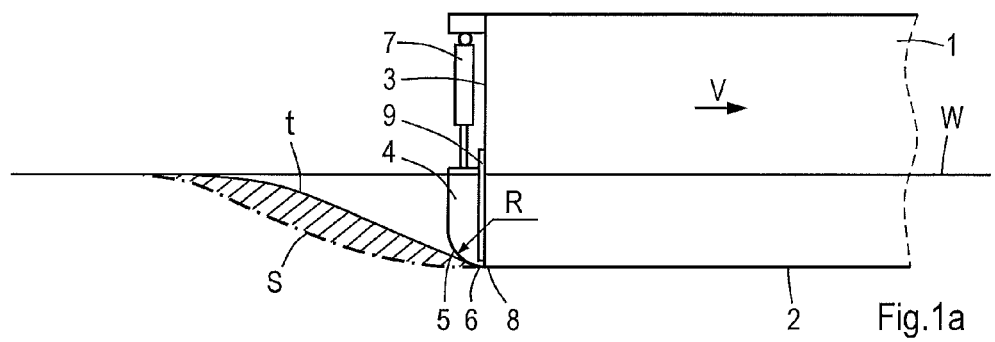
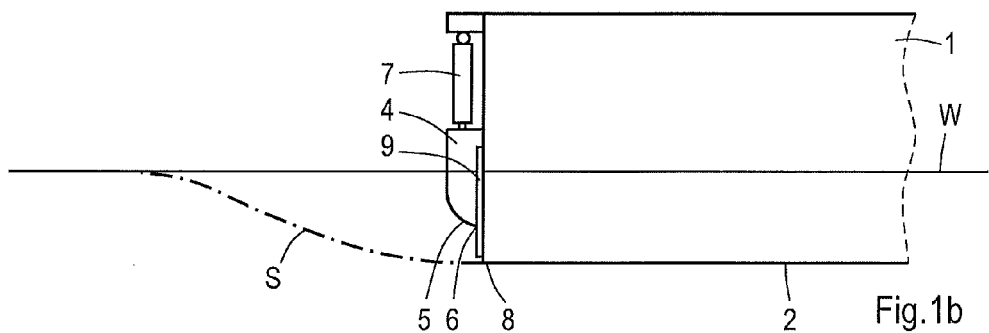
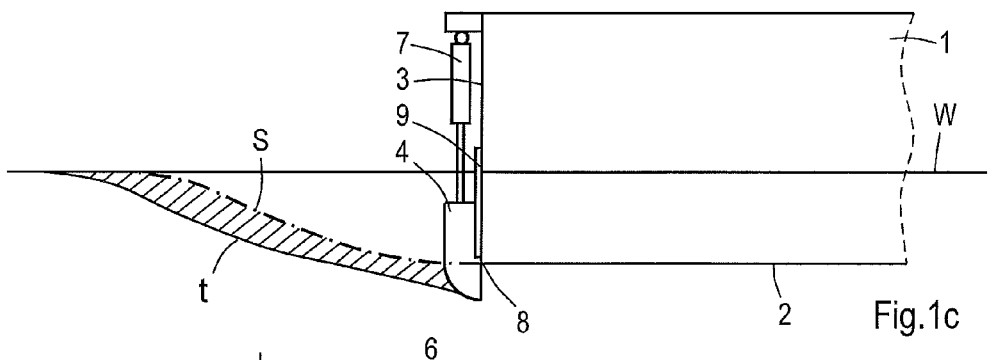
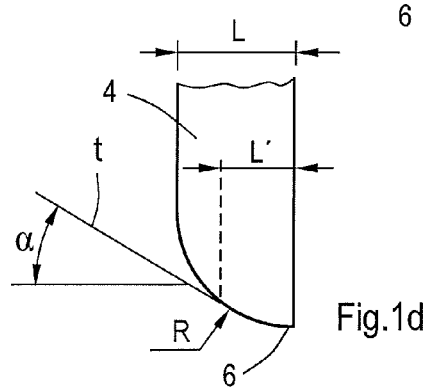
Fig. 1a
Fig. 1b
Fig. 1c
Fig. 1d

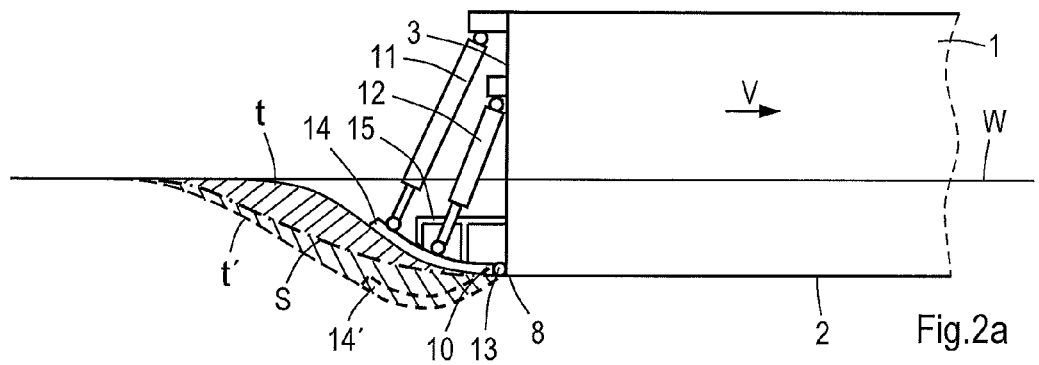
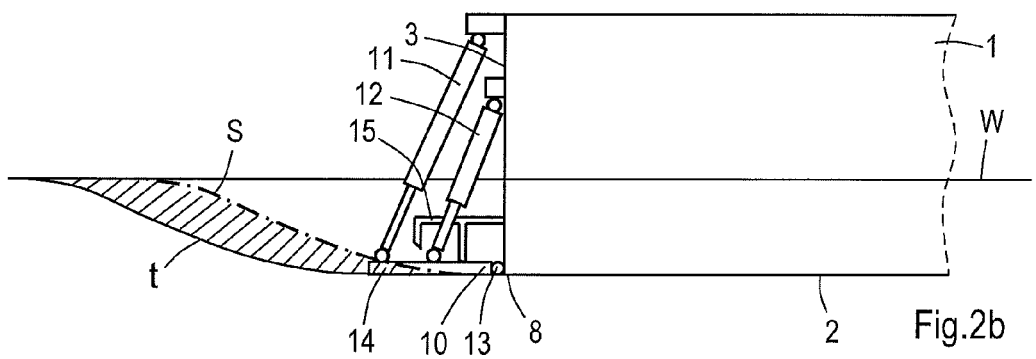
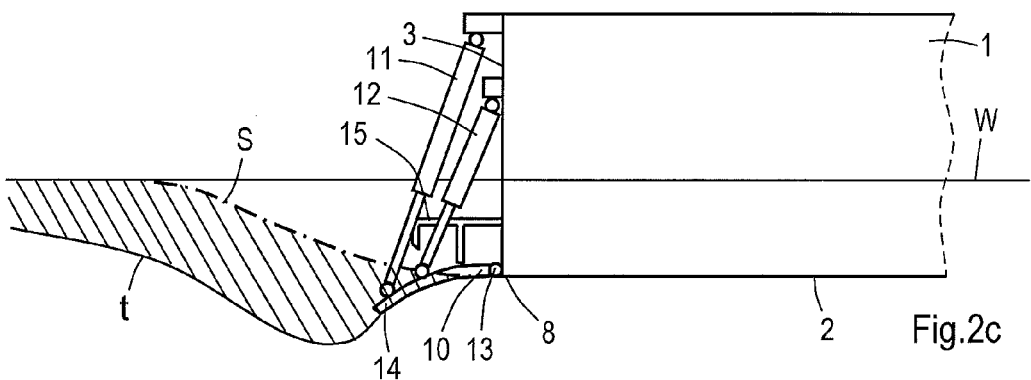

VESSEL WITH IMPROVED MOTION CONTROL

CROSS-REFERENCE TO RELATED APPLICATION

The present application is a 371 national stage filing of International patent application Serial No. PCT/EP2013/064490, filed Jul. 9, 2013, and published as WO 2014/009372 A1 in English.

BACKGROUND

The discussion below is merely provided for general background information and is not intended to be used as an aid in determining the scope of the claimed subject matter.

Aspects of the invention relate to a vessel, having a vessel length and a planing surface that in a forward moving vessel guides a water flow rearwards to a rear end and a transom at a stern of the vessel, mounted on the transom is an interceptor and an actuator to move the interceptor in vertical direction. Such a vessel is known from U.S. Pat. No. 6,571,724 wherein the vessel has two interceptors mounted on the transom for reducing the rolling movement of the vessel.

For improving the behaviour of vessels in waves or at high speeds other types of motion controllers are known. Common for all known motion controllers is the fact that these are designed for generating at high speeds an additional (upward) and changeable lift at the stern of the vessel. However, from the use of T-foils it may be concluded that providing a reduction of the lift at the stern of the vessel also may have very favourable effects for positively influencing the behaviour of (fast) vessels in waves. However T-foils have the disadvantage for fast ships that they generate considerable resistance at high speeds and that they wear and/or damage easily.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

Thus, the vessel is characterized in that the transom defines a sharp edge with the planing surface and the underside of the interceptor comprises a convex rounded edge extending upwards to the rear with a forward or leading edge of the convex rounded edge having a tangent approximately parallel to the water flow along the planing surface near the transom, and/or the transom defines a convex rounded edge with the planing surface with a forward or leading edge of the convex rounded edge being tangent to the planing surface and the interceptor defines at its lowest part a sharp edge that can move behind the convex rounded edge in vertical direction, and/or the transom and the interceptor both have a convex rounded edge and the tangent to the convex or rounded edge at the forward or leading edge of the interceptor is approximately parallel to the tangent at the rear of the convex rounded edge extending from the planing surface to the transom.

The invention is based upon the so-called Kutta condition (basically stating that a sharp transition is needed for creating lift). When said transition between the rear end of the lower planing surface and the stern defines a sharp edge, the hydrodynamic conditions fulfil such a Kutta condition and at high speeds an (upward) lift is created. This upward lift can have the customary value for a fast sailing ship when the water flow along the lower planing surface passes along a sharp edge that is in line with the flow along the lower planing surface. When the sharp edge is lower than the lower planing surface and no longer in line with the flow along the lower planing surface there is an additional lift. However, when the water flow along the lower planing surface can follow a convex rounded edge as specified above, the Kutta condition is not met, the water flow along the lower planing surface is bended upwards and a reduction (or even complete elimination) of the lift is created. Thus, the invention allows changes in the vertical forces on the stern of the vessel and a broader range of motion control of the vessel in waves and reduction of pitching and/or rolling by using this motion control.

In a further embodiment the convex rounded edge on the interceptor and/or the planing surface has a radius that might decrease towards the rear of the vessel and the radius of the convex rounded edge is at least 0.3/0.5 percent of the vessel length or preferably at least 0.1 meter. In this way, the interceptor and/or the planing surface has a curvature that ensures that the water flow follows the convex rounded edge.

In a further embodiment, a first interceptor actuated by a first actuator is mounted at the starboard side of the vessel and a second interceptor actuated by a second actuator is mounted at the port side of the vessel. In this way, the first flow guiding means and the second flow guiding means can generate different lift and can create a torque in longitudinal direction on the vessel and so can reduce rolling.

In a further embodiment of the vessel, the interceptor comprises a plate extending in parallel and adjacent to and behind the transom, which plate at its lower end is provided with an upwardly rounded edge extending from a leading edge of the plate in a rearward direction, which plate is vertically movable along the transom to any desired position between a first position in which its leading edge is substantially flush with the rear end of the lower planing surface and further positions in which the leading edge is located at a higher or a lower level than said rear end of the lower planing surface.

In the first position of the plate the maximum reduction of the lift is created because in a fast moving vessel the water flow follows the contour of the convex rounded edge. In a further position with the leading edge of the interceptor is at a higher level than the rear end, there is a sharp edge between the transom and the rear end of the lower planing surface (fulfilling the Kutta condition) in which an upward lift is created. In a further position wherein the leading edge of the convex rounded edge of the interceptor is lower than the rear end of the lower planing surface, the interceptor pushes the flow downwards to create a stronger upward lift. In intermediate positions between the first position and the described further positions there will be a lift effect that is smaller than the lift effect in the described further positions.

It is noted, that "vertically movable" also encompasses movements of the plate which deviate from a strict vertical movement (for example when the vessel is provided with an angling transom). For guiding the plate along the transom a rail can be mounted on the transom and the actuator moves the plate along the rail. In other embodiments other means for guiding the interceptor and/or plate in vertical direction along the transom may be used.

Preferably, the convex rounded edge, as seen in the longitudinal direction of the vessel, has a length of at least 0.2 meter or preferably at least 0.4 meter. This length might depend on the dimensions of the vessel.

Further, preferably, the convex rounded edge has a radius of curvature of at least 0.4 meter. Such a large radius ensures at specific speeds that the water flow follows the convex rounded edge.

Further it is possible that the leading edge of the plate in a further position of the plate is located 20-40 cm above said rear end of the lower planing surface, again depending on the dimensions of the vessel.

In another embodiment, the plate too is movable to a further position in which its leading edge is located at a lower level than said rear end of the lower planing surface, for example such that the leading edge of the plate in the third position of the plate is located 5-10 cm below said rear end of the lower planing surface. In such an embodiment, the plate also can function as a conventional interceptor for increasing the upward lift. As a result the plate may be used for the motion control over a broad range of circumstances.

In an alternative embodiment of the vessel invention, having a vessel length and a planing surface in a forward moving vessel guiding a water flow to a rear end and a transom at a stern of the vessel, wherein below and behind the transom a flexible plate is connected to the rear end of said planing surface and an actuator can deform the flexible plate to form an upwardly curved plate with a convex surface facing downwardly and to form a flat plate that extends in line with the water flowing along the lower planing surface.

When the flexible plate extends as a flat plate substantially in a straight line backwards from the rear end in line with the lower planing surface, the normal upward lift effect will be caused. By bending the flat plate upwards to a curved plate with a convex surface facing downwards the water flow along the lower planing surface will follow this convex surface for some distance. This Coanda effect pulls the convex surface into the water and reduces or removes the lift force.

In accordance with an embodiment, the flexible plate comprises two or more stiff plates coupled by hinges and wherein preferably limiting means limit a hinge angle between to adjacent stiff plates to 4-6 degrees. In this way, the flexible plate can be more robust. Limiting the hinge angle ensures that the water flow follows the flexible plate also from one stiff plate to the adjacent stiff plate.

In accordance with an embodiment, the actuator can pull the flexible plate or the two or more stiff plates against a support mounted on the transom to form the convex surface. In this way, the actuator positions the flexible plate in a well defined position on the transom when forming the convex surface.

Preferably the actuator comprises acting components that act at least in two directions and/or between at least two different longitudinal positions on the flexible plate or the stiff plates. In this way, the actuator can position the end of the flexible plate at different heights in stable and well defined positions so that the flexible plate does not move under the various loads caused by the water flow.

In one embodiment the leading edge of the flexible plate and the rear end of the lower planing surface are interconnected by a hinge. In addition to adjusting the shape (curvature) of the flexible plate this also allows an adjustment of the relative position (angle) between the plate and planing surface.

In another embodiment, however, the leading edge of the flexible plate and the rear end of the lower planing surface are rigidly interconnected. This allows a simpler construction.

In yet another embodiment of the vessel invention, wherein in front of the location where the interceptor is mounted on the transom and the convex rounded edge is on the rear end and the forward end of the convex rounded edge is tangent to the lower planing surface and extends rearwards to the transom and the interceptor comprises a plate with a sharp lower edge, which plate is vertically movable along the transom between a first position in which the sharp lower edge of the interceptor is above the convex rounded edge and a second position in which the sharp lower edge is at a level that is substantially the same height as the rear end of the lower planing surface and preferably also to a third position in which said sharp lower edge is located at a level below the rear end of the lower planing surface.

In the second position of the plate the convex rounded edge effectively is located in a recess between the planar part of the lower planing surface adjacent the rounded edge and the lower edge of the plate and will not influence the water flow. The rearward lower edge of the plate forms the sharp edge that fulfils the Kutta condition and an upward lift is created. In the first position of the plate, however, the rounded edge will become active and the lift is reduced. In the third position the plate again forms a sharp edge, but now lower than the planing surface increasing the upward lift still further than the in the second position.

In one embodiment the convex rounded edge on the interceptor and/or the planing surface has a radius of curvature that might decrease towards the rear of the vessel and the radius of the convex rounded edge is at least 0.3/0.5 percent of the vessel length or at least 0.1 meter.

In another embodiment the lower edge of said plate in the third position is located 15-20 cm below the rear end of the lower planing surface adjacent said convex rounded edge.

The invention is specifically fit for a vessel intended for use at high speed and/or at heavy seas, the vessel has a slender hull and a transom extending substantially vertically and might comprise two or more hulls.

In a further embodiment of the vessel, the convex rounded edge ends in a surface with a tangent that makes an angle with the horizontal plane that is more than 20 degrees, more than 30 degrees or more than 45 degrees. In this way, the convex rounded edge can have a larger radius ensuring better flow conditions for following the convex surface while limiting the dimensions in longitudinal dimensions of the ship. Increasing the angle with the horizontal plane to 30 or 45 degrees might result in stronger reduction of the lifting force and might be applicable for vessels at lower speeds.

In a further embodiment of the vessel a control system is provided with sensors for determining the pitching and/or rolling movement of the vessel and the control system controls the actuator(s) for reducing the pitching and/or rolling of the vessel during forward speed. In this way, the vessel can maintain a high forward speed also in heavy waves.

BRIEF DESCRIPTION OF THE DRAWINGS

Hereinafter the invention will be elucidated while referring to the drawing, in which:

FIG. 1, schematically, shows the rear part of a vessel in a first embodiment, in three different positions;

FIG. 2, schematically, shows the rear part of a vessel in a second embodiment, in three different positions;

DETAILED DESCRIPTION OF THE ILLUSTRATIVE EMBODIMENTS

Figure 3A:
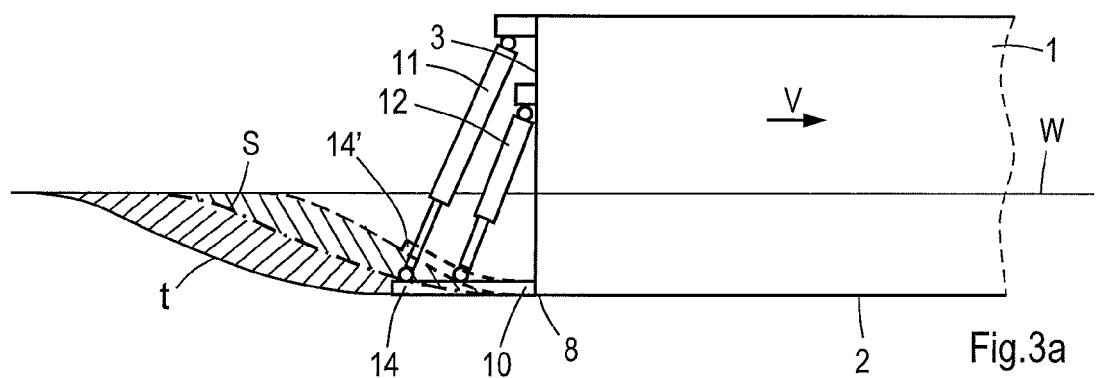
FIG. 3, schematically, shows the rear part of a vessel in a third embodiment, and FIG. 4, schematically, shows the rear part of a vessel in a fourth embodiment, in three different positions.

Referring to FIG. 1, a first embodiment of the rear part of a vessel 1 is shown schematically in a side view. The vessel 1 which moves at high speed (arrow V) over water with a water surface indicated with line w is provided with a slender hull having a lower planing surface 2 and sharp bow (not illustrated), and a stern provided with a transom 3 extending substantially vertically. The lower planing surface 2 ends with a rear end 8, with the transom 3. The transition from the lower planing surface 2 to the transom 3 is a sharp edge so that in general at higher speeds V the Kutta condition occurs and the water flow along the lower planing surface 2 to the rear remains free from the transom 3. The water surface in this standard flow situation is indicated with a dash-dot line s. The water flow along the lower planing surface 2 causes a lift force on the rear part of vessel 1 and this lift force influences how the vessel 1 proceeds through the water.

At the transition between the rear end of the lower planing surface 2 and the stern locally a plate 4 is provided extending in parallel and adjacent to and behind the transom 3. At its lower end said plate is provided with a convex to the rear upwardly rounded edge 5, in the shown embodiment with a radius R extending from a leading edge 6 of the plate, which is at the lowest underside of the plate 4, in a rearward direction. The plate 4 is vertically movable (for example by an actuator 7) along rails 9 mounted on the transom 3 to any desired position between positions respectively indicated in FIGS. 1a-c. In other embodiments the guidance of the plate 4 or its movements are effected by other means. In the figures the plate 4 is shown schematically and it will be clear that the schematic shape shown can be formed by plates to guide the flow and the plates can be strengthened with girders or any other means. There can be two or more plates 4 mounted side by side on the transom 3 with independent actuators 7 that are operated independently. Between the different plates 4 may be openings that prevent obstructing the flows from propulsion jets.

In a position shown in FIG. 1a, the leading edge 6 of the plate 4 is substantially flush with the rear end 8 of the lower planing surface 2. In this position the water will flow along the underside of the plate 4 and remains attached to the convex upwardly rounded edge 5 (Coanda effect) and flow (partly) upwardly along the convex rounded edge 5, the water surface of the flow as it passes under the plate 4 along the upwardly rounded edge 5 is indicated with a line t and this water surface t is higher than the standard water surface indicated with line s. The higher water surface t gives a resulting reduction of the upward lift at the stern region of the vessel 1.

In a position shown in FIG. 1b, the leading edge 6 of the plate 4 is located at a higher level than said rear end 8 of the lower planing surface 2, causing a sharp edge at the rear end 8 fulfilling the Kutta condition and thus causing the flow of water to disengage the stern (transom 3) in a rearward direction at the rear end 8, with a resulting increase of upward lift compared to the situation in FIG. 1a and a standard water surface indicated with line s that is comparable to the situation where there is no plate 4.

In a position shown in FIG. 1c the leading edge 6 of the plate 4 is located at a lower level than said rear end 8 of the lower planing surface 2. In this position the plate 4 basically functions as a state of the art interceptor downwardly diverting the flow of water to a water surface indicated with line t, that is below the standard water surface s and this diverted water flow causes an upward lift that is more than the upward lift described in FIG. 1b.

The convex rounded edge 5 of plate 4 is shown in detail in FIG. 1d. The convex rounded edge 5 as seen in the longitudinal direction of the vessel 1, has a length l that is between 20-40 cm. The rounded edge 5 may have a constant radius of curvature R of 20-40 cm that can be the same as the length l of the convex rounded edge 5 in longitudinal direction. In other embodiments, the radius of curvature might be variable or for instance start or end with a straight line. In situations where the radius of curvature R is variable the radius of curvature at the forward part of the convex rounded edge 5 might be larger than more to the rear. In the case that the convex rounded edge 5 starts with a straight line, the direction of this line is parallel to the lower planing surface 2. In order to ensure that convex rounded edge 5 creates an upwards directed water surface t a tangent to an end of the convex rounded edge 5 makes an angle α with the horizontal plane and the angle α is at least 20 degrees, or at least 30 degrees or at least 45 degrees, depending on the curvature of the convex rounded edge 5 and on the design speed of the vessel. As indicated in FIG. 1d with an interrupted line a shorter length l' of the convex rounded edge 5 is allowable where the radius R can be maintained at the same value as with the length l if the angle α is reduced from 90 degrees to for instance 30 degrees (as shown). For various situations this lower angle α leads to sufficient reduction of the upward or lift force.

The radius of curvature R of the convex rounded edge 5 has a minimum value that depends on the length of the vessel 1. As general value the radius of curvature R is at least 0.5% of the length of the vessel 1 and preferably more than 1.0% of the length of the vessel 1.

In the position of the plate 4 as shown in FIG. 1b, the leading edge 6 of the plate is located 20-40 cm above said rear end 8 of the lower planing surface 2, whereas in the position of the plate 4 shown in FIG. 1c, the leading edge 6 of the plate is located 15-20 cm below said rear end 8 of the lower planing surface 2.

Referring to FIG. 2 a second embodiment of the rear part of a vessel 1 is shown schematically in a side view. In this embodiment the vessel comprises a flexible plate 14 with a leading edge 10 and a hinge 13 connects the leading edge 10 to the rear end 8 of the lower planing surface 2. By means of two moving members 11,12 the flexible plate 14 is deformable between three positions respectively illustrated in FIGS. 2a-c. On the transom 3 is a support 15 for supporting the plate 14 in the topmost position.

In a position shown in FIG. 2a the plate 14, starting from its leading edge 10, is upwardly curved by the actuators 11, 12 with a convex side facing downwardly. In this position the flow of water follows the curved contour of the plate 14 and the water surface behind the plate 14 is indicated with the line t. This water surface t is above the standard water surface s, resulting in a reduction of the lift force.

In a position shown in FIG. 2c the plate 14, starting from its leading edge 10, is downwardly curved by the actuators 11, 12 with a convex side facing upwardly. In this position the water follows the curved contour of the plate 14 and the water surface behind the plate 14 is indicated with the line t. This water surface t is under the standard water surface s, resulting in a strong upward lift.

FIG. 2b illustrates a position in which the plate 14 extends substantially flat in a rearward direction. In such a position the plate 10 basically functions as a state of the art trim tab extending the flow in to the rear resulting in a water surface t that extends behind and approximately parallel to the standard water surface s.

The resulting lift is lowest in FIG. 2a, higher in FIG. 2b and highest in FIG. 2c.

The moving members 11,12 may comprise hydraulic, pneumatic or electric actuators, for example piston-cylinder assemblies acting on respective different longitudinal positions of the flexible plate 10. The leading edge 10 of the flexible plate 14 and the rear end 8 of the lower planing surface 2 are interconnected by a hinge 13, the moving members 11,12 not only may be used to change the shape of the flexible plate, but also may be used to change the position of the plate without changing its shape and cause a rotation around hinge 13. This is indicated in dotted lines by plate 14' in FIG. 2a and the resulting water surface t' behind the plate 14' is below the standard water surface s in similar way as in the position of plate 14 shown in FIG. 2c. This will cause a change of the angle between the leading edge 10 and rear end 8.

In a third embodiment illustrated in FIG. 3a the leading edge 10 of the flexible plate 14 and the rear end 8 of the lower planing surface 2 are rigidly interconnected, only allowing a change of the shape of the flexible plate while maintaining said leading edge 10 in line with the lower planing surface 2 near the rear end 8. In the position of flexible plate 14 indicated with the uninterrupted line the plate functions as an extender similar to FIG. 2 and the water surface is indicated with t. In the position indicated with interrupted lines as plate 14' the plate 14' is curved upwards with the convex curve directed downwards, the water flow follows the curved surface (Coanda effect) and there is reduced lift. In the shown embodiment the flexible plate 14 has a constant thickness which makes a constant curvature or a smaller curvature radius towards the front when bended most likely. Reducing the thickness (or stiffness) of the flexible plate 14 towards the rear might lead to a constant or even decreasing curvature radius towards the rear.

Figure 3B:
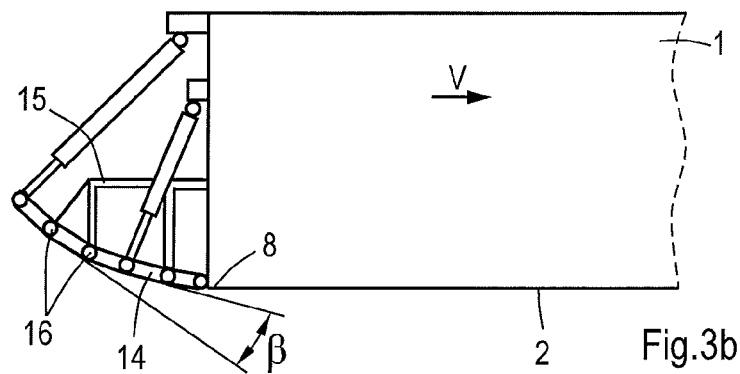

FIG. 3b shows an alternative embodiment wherein the plate 14, instead of being flexible is assembled from narrow stiff plates interconnected by hinges 16. Preferably the maximum angle β between adjacent stiff plates is limited to ensure that the water flow remains attached to the surface of the plates and follows the plates; in general the maximum angle β is 4 degrees and might be 6 degrees.

Figure 4A:
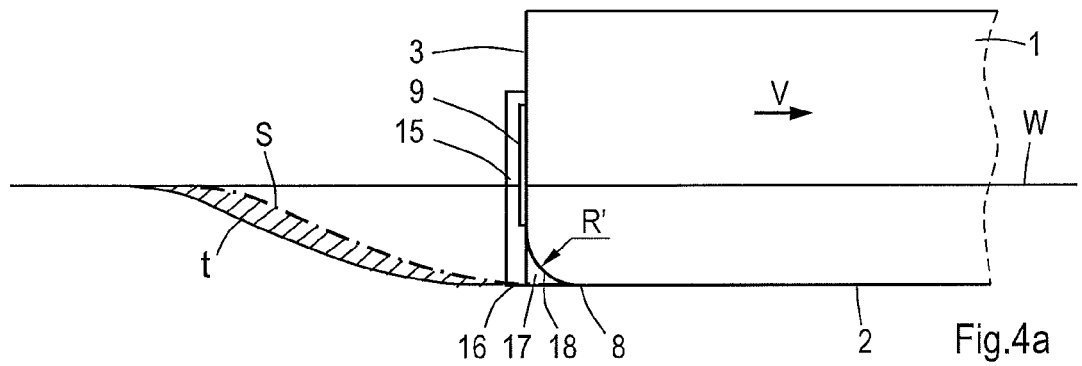
Figure 4B:
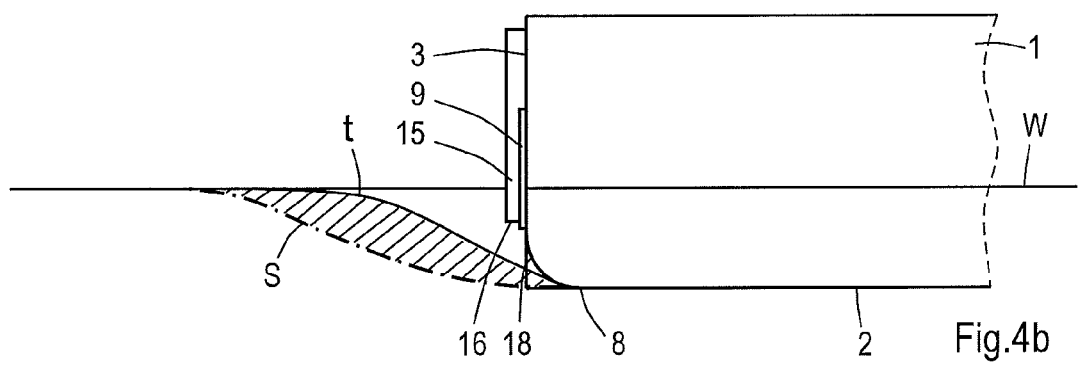
Figure 4C:
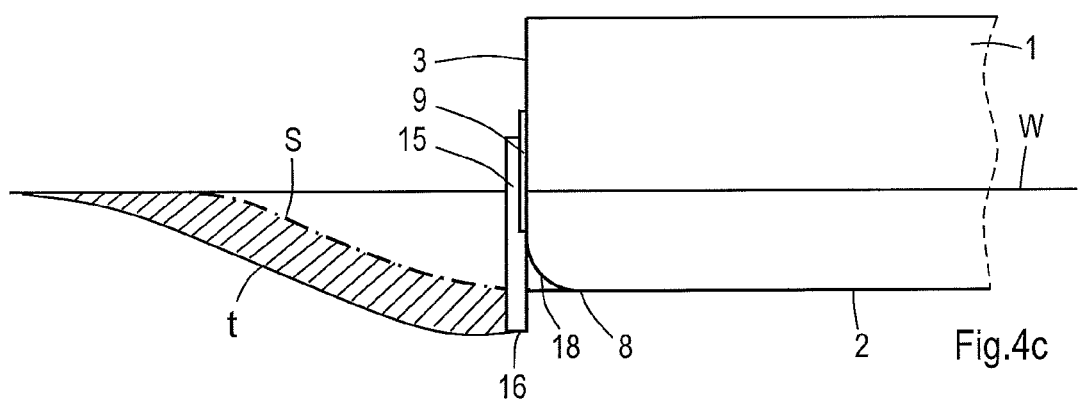

FIG. 4 shows a fourth embodiment of the rear part of a vessel locally comprising the combination of an upwardly rounded edge 18 (preferably with a radius of curvature R' of 10-40 cm) through which the rear end 8 of the lower planing surface 2 merges into the transom 3, and a plate 15 with substantially horizontal lower edge 16 with a sharp edge, as seen in the longitudinal direction of the vessel. This plate 15 extends in parallel and adjacent to and behind the transom 3 and is vertically movable along rails 9 mounted on the transom 3 (by a moving member not illustrated) to any desired position between three positions respectively indicated in FIGS. 4a-c.

In a position shown in FIG. 4a, the lower edge 16 of the plate 15 is substantially flush with the rear end 8 of the lower planing surface 2 adjacent said rounded edge 18 so that the water surface of the water flowing behind the plate 15 follows a line t that is approximately parallel to the standard water surface s. In this position of the plate 15 the rounded edge 18 effectively is located in a recess 17 between the planar part (rear end 8) of the lower planing surface 2 adjacent the rounded edge 14 and the lower edge 16 of the plate 15 and thus will not influence the water flow. In this position a normal lift is created.

In a position shown in FIG. 4b, the lower edge 16 is located at a level near or above the upper end of said rounded edge 18 and the flow of water will at least partially follow the contour of the convex rounded edge 18 and create a water surface indicated with line t that is above the standard water surface s and this causes a reduction of the lift.

In a position shown in FIG. 4c, said lower edge 16 is located at a level below the rear end 8 of the lower planing surface 2 adjacent said rounded edge 18 (preferably 15-20 cm below it) causing the plate 15 to function as a state of the art interceptor that creates a water surface t behind the vessel 1 that is below the standard water surface s for increasing the lift above its normal level.

In the embodiment shown in FIG. 4 the radius R' of the rounded edge 18 is indicated as having a relatively small and constant value. It will be clear that in other embodiments the radius R' can have a changing value and at the front side of the rounded edge 18 the radius R' can have a larger value and this larger value for the radius R' decreases towards the rear. As discussed earlier the rounded edge 18 is shown in FIG. 4 as a 90 degree curve whereby the tangent to the curve is at the front side in line with the planing surface 2 and at the rear side the tangent to the rounded edge 18 is in line with the transom 3. In other embodiments (not shown) the tangent to the rounded edge 18 at the rear side of the curve can make a sharp angle with the transom 3, for instance an angle that is smaller than 60 degrees when the transom 3 is vertical. This embodiment is suitable for cooperation with the plate 15 as shown in FIG. 4 with a sharp lower edge 16.

Embodiments (not shown) whereby the rounded edge 18 on the hull of the ship extends from the planing surface 2 to the transom 3 and the curve makes an angle that is more 60 degrees with the transom 3, for instance 80 degrees, and ends with a sharp edge, the transom might have a plate 4 as shown in FIG. 1, with a convex rounded edge 5 at the bottom of the plate 4 and whereby the tangent to the convex rounded edge 5 on the plate 4 at the lowest and most forward position of the plate 4 is parallel to the tangent on the rounded edge 18 on the hull of the ship near the transom 3. It is clear that changing the height of the plate 4 influences the flow at the rear of the ship 1 and changes the lift on the rear of the ship.

Further embodiments might be formed by combining the illustrated and described embodiments whereby an interceptor stimulates or interrupts a flow along the planing to follow a convex rounded edge.

The invention is not limited to the embodiments described before which may be varied widely within the scope of the invention as defined by the appending claims.

The invention claimed is:

1. A vessel having a vessel length and a planing surface that in forward movement of the vessel guides a water flow rearwards to a rear end and a transom at a stern of the vessel, the vessel comprising an interceptor movably mounted on the transom and an actuator connected to the interceptor and configured to move the interceptor along the transom in a vertical direction, wherein the transom defines a sharp transom edge with the planing surface and an underside of the interceptor comprises an interceptor bottom surface that is convex and that extends upwards to a rear of the interceptor and the interceptor bottom surface defines at its lowest part a forward or leading interceptor edge having a tangent approximately parallel to the planing surface near the transom.

2. The vessel according to claim 1 wherein the interceptor bottom surface has a radius that is at least 0.1 meter.

3. The vessel according to claim 1, wherein said interceptor comprises a plate extending in parallel and adjacent to and behind the transom, which plate at a lower end is provided with the interceptor bottom surface extending from a forward or leading interceptor edge of the plate in a rearward direction, which plate is vertically movable along the transom to any desired position between a first position in which the forward or leading interceptor edge is substantially flush with the rear end of the lower planing surface and further positions in which the forward or leading interceptor edge is located at a higher or a lower level than said rear end of the planing surface.

4. The vessel according to claim 3, wherein the interceptor bottom surface, as seen in the longitudinal direction of the vessel, has a length of at least 0.2 meter.

5. The vessel according to claim 3, wherein the interceptor bottom surface as seen in the longitudinal direction of the vessel has a length of at least 0.4 meter.

6. The vessel according to claim 3, wherein the forward or leading interceptor edge of the plate in a further position of the plate is located 0.2-0.4 meter above said rear end of the planing surface.

7. The vessel according to claim 1 wherein the vessel has a slender hull and a transom extending substantially vertically.

8. The vessel according to claim 1 wherein the interceptor bottom surface ends towards the rear in a surface with a tangent that makes an angle that is more than 20 degrees with the horizontal plane.

9. The vessel according to claim 1 wherein the interceptor bottom surface ends towards the rear in a surface with a tangent that makes an angle that is more than 30 degrees with the horizontal plane.

10. The vessel according to claim 1 wherein the interceptor bottom surface of the transom convex rounded edge ends towards the rear in a surface with a tangent that makes an angle that is more than 45 degrees with the horizontal plane.

11. The vessel according to claim 1 comprising a control system operably connected to the actuator having sensors for determining the pitching and/or rolling movement of the vessel, the control system configured to control the actuator to reduce the pitching and/or rolling of the vessel during forward speed.

12. The vessel according to claim 3, wherein the forward or leading interceptor edge of the plate in a further position of the plate is located 0.05-0.10 meter below said rear end of the planing surface.

13. The vessel according to claim 1, wherein the vessel has two slender hulls each having a transom extending substantially vertical.

14. The vessel according to claim 1 comprising a control system operably connected to the actuator having sensors for determining the pitching and/or rolling movement of the vessel, the control system configured to control the actuator to reduce the pitching and/or rolling of the vessel during forward speed.

15. The vessel according to claim 14, wherein in front of the location where the interceptor is mounted on the transom and the transom rounded edge is on the rear end and the forward end of the transom rounded edge is tangent to the lower planing surface and extends rearwards to the transom and the interceptor comprises a plate with a sharp lower edge, which plate is vertically movable along the transom between a first position in which the sharp lower edge of the interceptor is above the transom rounded edge and a second position in which the sharp lower edge is at a level that is substantially at the same height as the rear end of the planing surface.

16. The vessel according to claim 15, wherein the transom rounded edge has a radius that might decrease towards the rear of the vessel and the radius of the transom rounded edge is at least 0.1 meter.

17. The vessel according to claim 15, wherein the interceptor is moveable towards a third position in the third position the lower edge of said plate is located 0.15-0.20 m below the rear end of the lower planing surface adjacent said transom rounded edge.

18. A vessel having a vessel length and a planing surface that in a forward movement of the vessel guides a water flow rearwards to a rear end and a transom at a stern of the vessel, the vessel comprising an interceptor movably mounted on the transom and an actuator connected to the interceptor and configured to move the interceptor along the transom in a vertical direction, wherein the transom defines a transom convex rounded edge with the planing surface with a forward or leading edge of the transom convex rounded edge being tangent to the planing surface and the interceptor defines at its lowest part a forward or leading interceptor edge that can move behind the transom convex rounded edge in a vertical direction.

19. The vessel according to claim 18 wherein the transom convex rounded edge has a radius that is at least 0.1 meter.

20. The vessel according to claim 18 wherein the transom convex rounded edge ends towards the rear in a surface with a tangent that makes an angle that is more than 20 degrees with the horizontal plane.

21. The vessel according to claim 18 wherein the transom convex rounded edge ends towards the rear in a surface with a tangent that makes an angle that is more than 30 degrees with the horizontal plane.

22. The vessel according to claim 18 wherein or the transom convex rounded edge ends towards the rear in a surface with a tangent that makes an angle that is more than 45 degrees with the horizontal plane.

23. The vessel according to claim 18 wherein the vessel has a slender hull and a transom extending substantially vertically.

24. The vessel according to claim 18 wherein the vessel has two slender hulls each having a transom extending substantially vertical.

25. The vessel according to claim 18 wherein the transom defines a sharp transom edge with the planing surface and an underside of the interceptor comprises an interceptor bottom surface that is convex and that extends upwards to a rear of the interceptor and the interceptor bottom surface defines at its lowest part a forward or leading interceptor edge having a tangent approximately parallel to the planing surface near the transom.

* * * * *